F. B. MUNSHAW.
TILLING IMPLEMENT.
APPLICATION FILED MAY 23, 1919.

1,368,962.

Patented Feb. 15, 1921.
3 SHEETS—SHEET 1.

Inventor
Frank B. Munshaw
By Cyrus W. Rice
his Attorney

Witness:
Geo. L. Chapel

F. B. MUNSHAW.
TILLING IMPLEMENT.
APPLICATION FILED MAY 23, 1919.
1,368,962.
Patented Feb. 15, 1921.
3 SHEETS—SHEET 2.
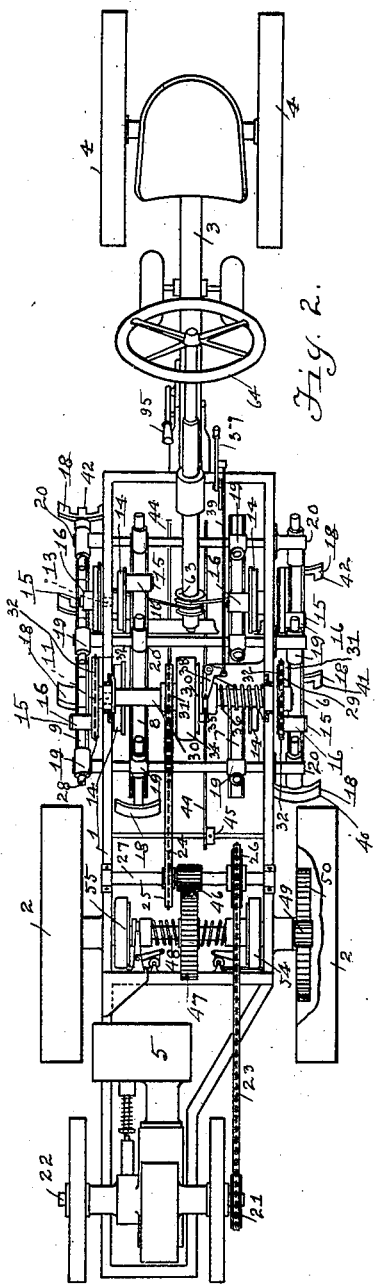
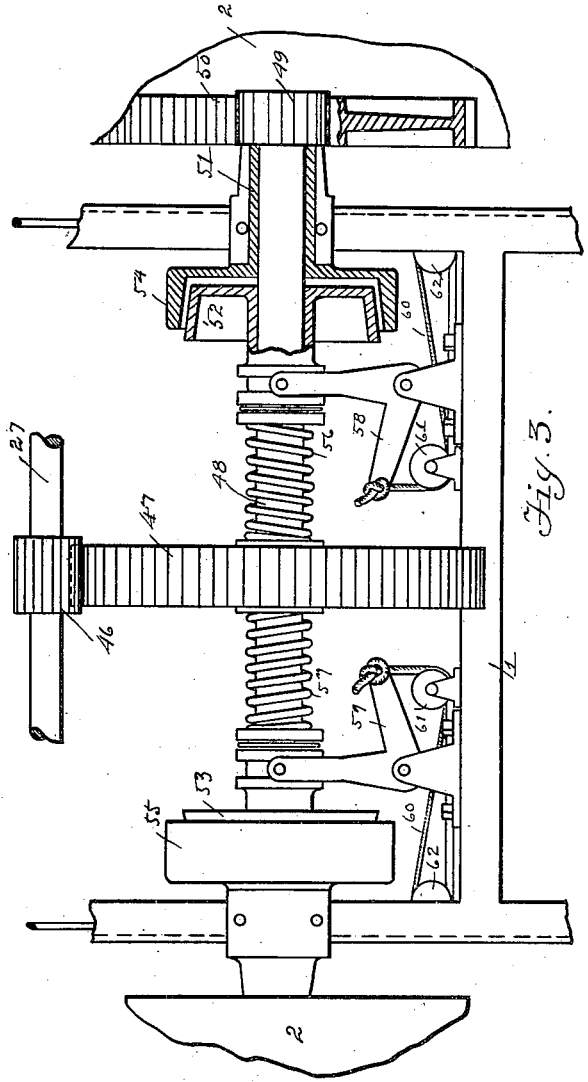
Inventor
Frank B. Munshaw
By Cyrus W. Rice
his Attorney
Witness:
Geo. L. Chapel.

the trailing rearward member 3 supported
UNITED STATES PATENT OFFICE.

FRANK B. MUNSHAW, OF GRAND RAPIDS, MICHIGAN, ASSIGNOR OF ONE-THIRD TO HAROLD MUNSHAW AND ONE-THIRD TO EDWIN N. BARNARD, BOTH OF DETROIT, MICHIGAN.

TILLING IMPLEMENT.

1,368,962. Specification of Letters Patent. Patented Feb. 15, 1921.

Application filed May 23, 1919. Serial No. 299,089.

*To all whom it may concern:*

Be it known that I, FRANK B. MUNSHAW, a citizen of the United States, residing at Grand Rapids, in the county of Kent and State of Michigan, have invented new and useful Improvements in Tilling Implements, of which the following is a specification.

The present invention relates to tilling implements; and its object is, generally, to provide an improved traveling implement whereby the soil may be readily and effectively tilled and the crops cultivated; and more particularly, to provide such an implement having a plurality of tilling members horizontally disposed and movable together in vertical circuit through positions substantially parallel; and further, to provide a plurality of sets of such tilling members, each set being movable as aforesaid and one set in advance of another; and further, to provide a vehicular tilling implement comprising forward and rearward members with connecting means whereby they may interrelatively move laterally and may be interrelatively tilted and held in tilted position; and further, to provide improved means for uncoupling the clutch members intermediate the driving means and the several driven vehicle wheels of such implements and the like.

These and any other objects hereinafter appearing are attained by, and the invention finds preferable embodiment in, the structure particularly described in the body of this specification and illustrated by the accompanying drawings, in which:—

Fig. 2 is a top plan view thereof;

Fig. 3 is a like view of a portion of the same; and

Figure 1:
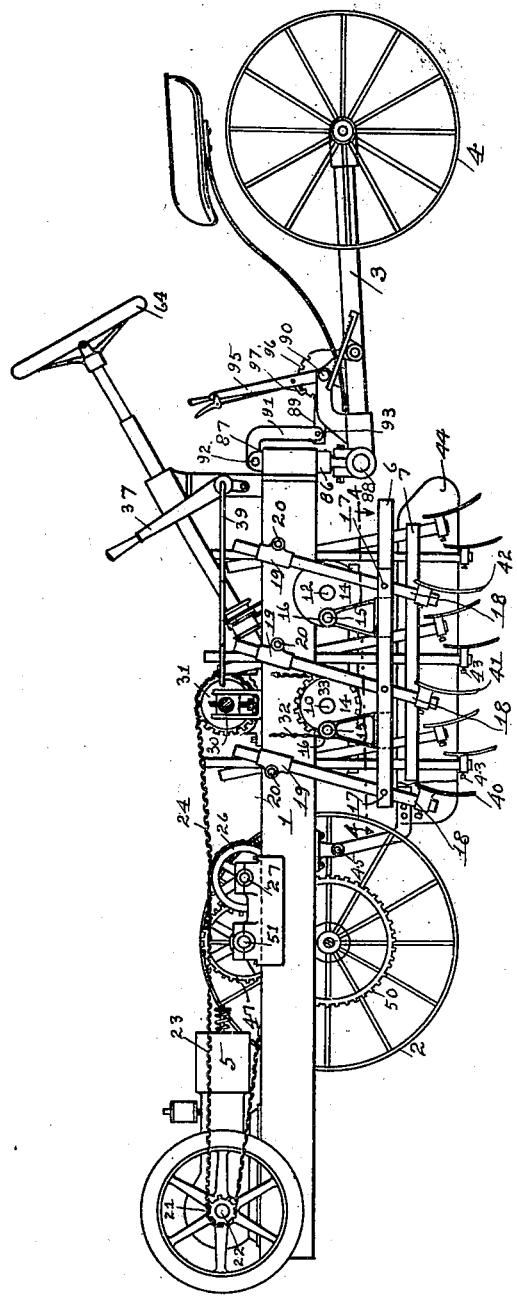
Figure 1 is a side view of a traveling tilling implement the near traction wheel being removed.
Figure 4:
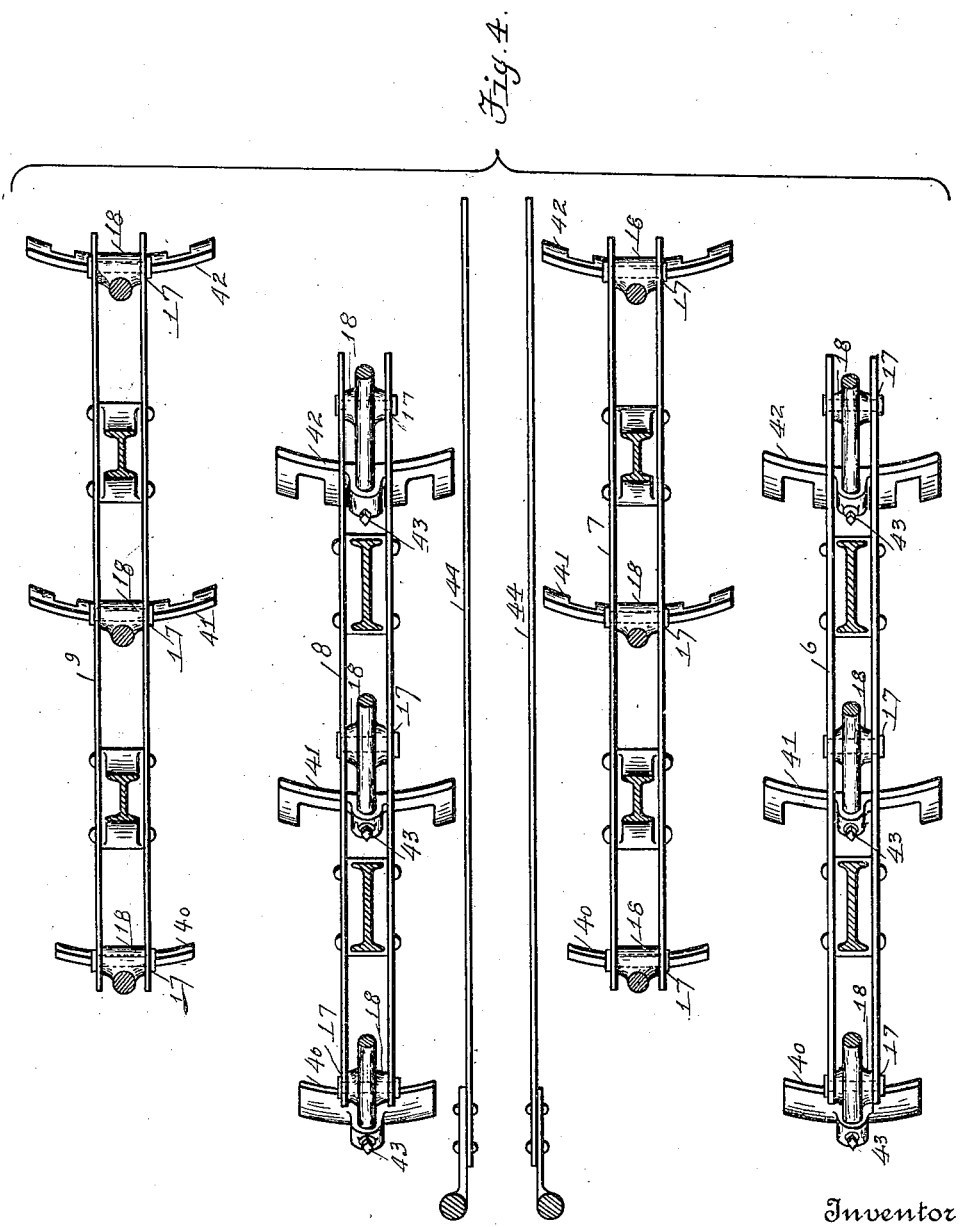
Fig. 4 is a sectional view of certain parts taken on a horizontal plane corresponding to line 4 of Fig. 1.

In the embodiment of the invention chosen for illustration by the drawings and for detailed description in the body of this specification, the traveling tilling implement has the forward member or body 1 supported on the traction or driving wheels 2, and the trailing rearward member 3 supported on vehicle wheels 4. The forward member or body 1 carries the operative parts of the implement, including a suitable motor 5 which drives the traction wheels 2 and also the tilling mechanism. The tilling mechanism comprises a plurality—four being shown—of carriages 6, 7, 8, 9, being horizontal bars parallelly disposed in the longitudinal direction of the body 1. These carriages are moved in vertical circuits in such manner that each is substantially horizontal in its every position in its circuit, while one carriage is in constantly changing horizontal relation to another. To effect this end, two co-axial shafts 10, 11 are journaled on the body transversely thereof, and two co-axial shafts 12, 13 are similarly journaled and spaced rearwardly from and parallel with the shafts 10, 11. Each of these shafts carries adjacent its ends a pair of cranks 14 (shown in the form of disks), angularly spaced and having wrist pins 15. Each of the carriages has a pair of bearings 16 spaced correspondingly to the spacing of the front pair and rear pair of shafts, in which bearings turn respectively the wrist pin of one of the forward cranks and that of the rearward crank directly behind it. To each carriage is rockably connected at 17, 17 a plurality—three in the construction illustrated—of tilling members 18 whose upwardly extending rods reciprocate in guide members 19 pivotally mounted at 20 on the body 1. At least one pair, as the forward pair 10, 11 of the shafts are directly driven by the motor 5, through suitable connections, as the sprocket wheel 21 on the motor's shaft 22, the chains 23, 24, sprocket wheels 25, 26 on the shaft 27, the sprocket wheels 28, 29, 31 on the shaft 30, chains 32 and sprocket wheels 33 on the forward pair 10, 11 of shafts respectively, said wheels 33 being the crank disks having the wrist pins 15. The rearward pair of shafts 12, 13 are driven by the motor indirectly through the carriages. A suitable cone clutch having clutch members 34, 35 serves to couple the sprocket wheel 31 with the shaft 30, the member 35 being pressed into coupling engagement by the spring 36, and being released from such engagement by the hand lever 37, bell crank fork 38 and rod 39 connecting the same.

It will be seen that owing to the angular spacing of the cranks on the shafts 10, 11, 12, 13 respectively, the carriages are moved in regular sequence in their circuits, whereby the tilling operation is not intermittent but uniformly constant.

The earth engaging elements, 40, 41, 42 of the tilling members are removably secured as by set screws 43 to the lower ends of the upwardly extending rod portions of said tilling members, and are preferably; one—the foremost—spade-like in form; the next, a fork with few tines; and the third and rearmost, a fork with a greater number of tines. By this arrangement, the earth is more preferably pulverized. Suitable shields 44 pivotally mounted at 45 on the body, extend rearwardly, their lower edges resting on the ground, so that clods and the like may not be thrown inwardly by the tilling members against the row of plants which is straddled by the implement.

The implement may be propelled by means of the gear 46 on the shaft 27 (which carries the sprocket wheel 26) said gear meshing with the gear 47 on the shaft 48 coupled with the shafts 51 carrying gears 49 meshing with gears 50 on the traction wheels respectively. This shaft 48 carries clutch members 52, 53 coöperating with the clutch members 54, 55 respectively carried by the shafts 51, the members of each clutch being pressed into coupling engagement by springs 56, 57. The movable members 52, 53 of the clutches may be uncoupled by the bell crank forks 58, 59 from which leads the cord 60 over sheaves 61, 62 to the drum 63 on the shaft of the hand wheel 64: by turning this wheel one way or the other, the clutches may be severally uncoupled.

The sprocket wheel 31 is so connected with the motor that the carriages are moved horizontally at greater speed than the travel of the implement over the ground. Thus the travel of the implement is aided by the engagement of the tilling members with the earth.

The rearward or trailing member 3 of the implement, is connected to the body of the forward member 1 by a spindle 86 journaled vertically on the forward member at 87 and journaled horizontally at 88 on the rearward member. A toggle comprises the arm 89 pivotally mounted on a horizontal axis at 90 on the rearward member, and the arm 91 pivotally connected at 92 to the spindle 86 and at 93 to the other arm 89 of the toggle. The shaft 90 to which the arm 89 is keyed may be swung as by its hand lever 95 to raise or lower the body 1 of the forward member of the implement and thereby the tilling members carried thereby, and when swung to desired position, the two members 1 and 3 of the implement may be held in such position by the notched sector 96 and pawl 97.

It will be seen that the forward member 1 is approximately balanced on the axis of its supporting traction wheels 2, the weight of the rearward member 3 serving to keep the tilling members in operative contact with the ground.

The invention being intended to be pointed out in the claims, is not to be limited to or by details of construction of the particular embodiment thereof hereinbefore shown or described.

I claim:

1. In a traveling implement of the character described; a body; a carriage supported thereby; means for moving the carriage in vertical circuit through positions substantially horizontal; a plurality of tilling members rockably connected to the carriage and having a guided rocking and longitudinal movement on the body.

2. In a traveling implement of the character described; a body; a plurality of parallelly disposed carriages supported thereby; means for moving the carriages in vertical circuits through positions wherein the carriages are severally substantially horizontal and in changing interrelation; a plurality of tilling members rockably connected to the carriages respectively and having a guided rocking and longitudinal movement on the frame.

3. In a traveling implement of the character described; a body; cranks rotatable on axes spaced horizontally and extending transversely of the body; means for directly rotating at least one of the cranks; a carriage having bearings for the cranks' wrist pins respectively and spaced correspondingly to said axes; a plurality of tilling members rockably connected to the carriage and having a guided rocking and longitudinal movement on the body.

4. In a traveling implement of the character described; a body; a rotatable shaft extending transversely of the body and having at least a pair of angularly spaced cranks; a second rotatable shaft horizontally spaced from the first shaft parallelly and having at least a pair of angularly spaced cranks; means for directly rotating at least one of the shafts; carriages each having bearings for the wrist pin of one of one pair of cranks and for the wrist pin of one of the other pair of cranks, said bearings being spaced correspondingly to said shafts; a plurality of tilling members rockably connected to the carriages respectively and having a guided rocking and longitudinal movement on the frame.

5. In a traveling implement of the character described; a body; a carriage supported thereby; means for moving the carriage in vertical circuit through positions substantially horizontal; a plurality of tilling members rockably mounted on the carriage; a plurality of guides rockably mounted on the body and adapted to longitudinally guide the tilling members respectively.

6. In an implement of the character described; means for traveling the same; a carriage supported by the implement; means for moving the carriage in vertical circuit through positions substantially horizontal, the last-mentioned means being so connected with the first-mentioned means as to move the carriage horizontally at greater speed than the travel of the implement; a plurality of tilling members carried by the carriage.

In testimony whereof I have hereunto set my hand at Grand Rapids, Michigan, this 19th day of May, 1919.

FRANK B. MUNSHAW.